US010218643B2

(12) United States Patent
Huynh et al.

(10) Patent No.: US 10,218,643 B2
(45) Date of Patent: Feb. 26, 2019

(54) APPARATUS AND METHOD FOR SCALABLE AND FLEXIBLE ACCESS CONTROL LIST LOOKUP IN A NETWORK SWITCH

(71) Applicant: Cavium, LLC, Santa Clara, CA (US)

(72) Inventors: Jeffrey Huynh, San Jose, CA (US); Anh Tran, Santa Clara, CA (US); Weihuang Wang, Los Gatos, CA (US)

(73) Assignee: Cavium, LLC, Santa Clara, CA (US)

( * ) Notice: Subject to any disclaimer, the term of this patent is extended or adjusted under 35 U.S.C. 154(b) by 0 days.

(21) Appl. No.: 15/419,942

(22) Filed: Jan. 30, 2017

(65) Prior Publication Data

US 2018/0219800 A1   Aug. 2, 2018

(51) Int. Cl.
| | |
|---|---|
| *H04L 12/26* | (2006.01) |
| *H04L 12/935* | (2013.01) |
| *H04L 29/06* | (2006.01) |
| *H04L 9/08* | (2006.01) |

(52) U.S. Cl.
CPC .......... *H04L 49/3054* (2013.01); *H04L 9/088* (2013.01); *H04L 69/22* (2013.01); *H04Q 2213/13215* (2013.01)

(58) Field of Classification Search
None
See application file for complete search history.

(56) References Cited

U.S. PATENT DOCUMENTS

| | | | | |
|---|---|---|---|---|
| 2013/0142039 | A1* | 6/2013 | Bloch | H04L 45/7457 370/230 |
| 2014/0093084 | A1* | 4/2014 | De Atley | H04L 9/0861 380/277 |
| 2017/0317922 | A1* | 11/2017 | Livak | H04L 45/26 |
| 2018/0097730 | A1* | 4/2018 | Basso | H04L 12/4625 |

\* cited by examiner

*Primary Examiner* — Zewdu A Beyen (57) ABSTRACT

A network switch to support scalable and flexible access control list (ACL) lookup comprises a packet processing pipeline including a plurality of packet processing units each configured to generate a master key for an ACL lookup request to a memory pool and process a received packet based on ACL search results. The network switch further includes said memory pool including a plurality of memory groups each configured to maintain a plurality of ACL tables to be searched in one or more SRAM memory tiles of the memory group, accept and format the master key generated by the packet processing unit into a compact key based on a bitmap per user configuration, hash the formatted compact key and search the ACL tables stored in the one or more SRAM memory tiles using the formatted compact key, process and provide the ACL search results to the requesting packet processing unit.

31 Claims, 4 Drawing Sheets

APPARATUS AND METHOD FOR SCALABLE AND FLEXIBLE ACCESS CONTROL LIST LOOKUP IN A NETWORK SWITCH

CROSS-REFERENCE TO RELATED APPLICATIONS

This application is related to co-pending U.S. patent application Ser. No. 15/419,962, filed Jan. 30, 2017, and entitled "Apparatus and method for scalable and flexible wildcard matching in a network switch," which is incorporated herein in its entirety by reference.

BACKGROUND

Network switches/switching units are at the core of any communication network. A network switch typically has one or more input ports and one or more output ports, wherein data/communication packets are received at the input ports, processed by the network switch through multiple packet processing stages, and routed by the network switch to other network devices from the output ports according to control logic of the network switch.

Access control list (ACL) is a list of rules often used by a network switch to filter network traffic by limiting (e.g., permitting or denying) network packets access to certain source/destination IP ports and/or addresses. ACL is typically stored the memory of the network switch in the form of tables. In some cases, they are stored in TCAM memories. For each incoming packet, the ACL rules can be looked up by the network switch via search/lookup operations on the tables stored in the memory of the network switch and control logic of the network switch takes actions as instructed by the table search results or takes a default action in case of a table search miss.

Wildcard matching (WCM) is a type of pattern/mask matching by a network switch where matching of fields can either be an explicit match or a wildcard match where presence of the wildcard indicates a don't care field that any arbitrary value can match. WCM lookup result is a set of rules commonly used by the network switch for routing network traffic where a wildcard match means the network switch does not care what the value is in the specified field. In some embodiments, WCM can also be "hybrid", which supports range matching where any value within a range value pairs would result in a match.

Static random-access memory (SRAM) is one type of memory commonly used in network switches, wherein SRAM supports direct memory access and typically has lower power consumption and occupies less space in a network switch compared to other types of memories (e.g., TCAM). Traditionally, SRAM is not always suitable for maintaining and handling ACL lookup operations because of its lack of support for multiple possible states that include a "Don't Care" or "X" state. With the increasing demand of high throughput network switches, it is desirable to enable SRAM to accommodate ACL lookup and WCM operations including range matching in a network switch for additional flexibility.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
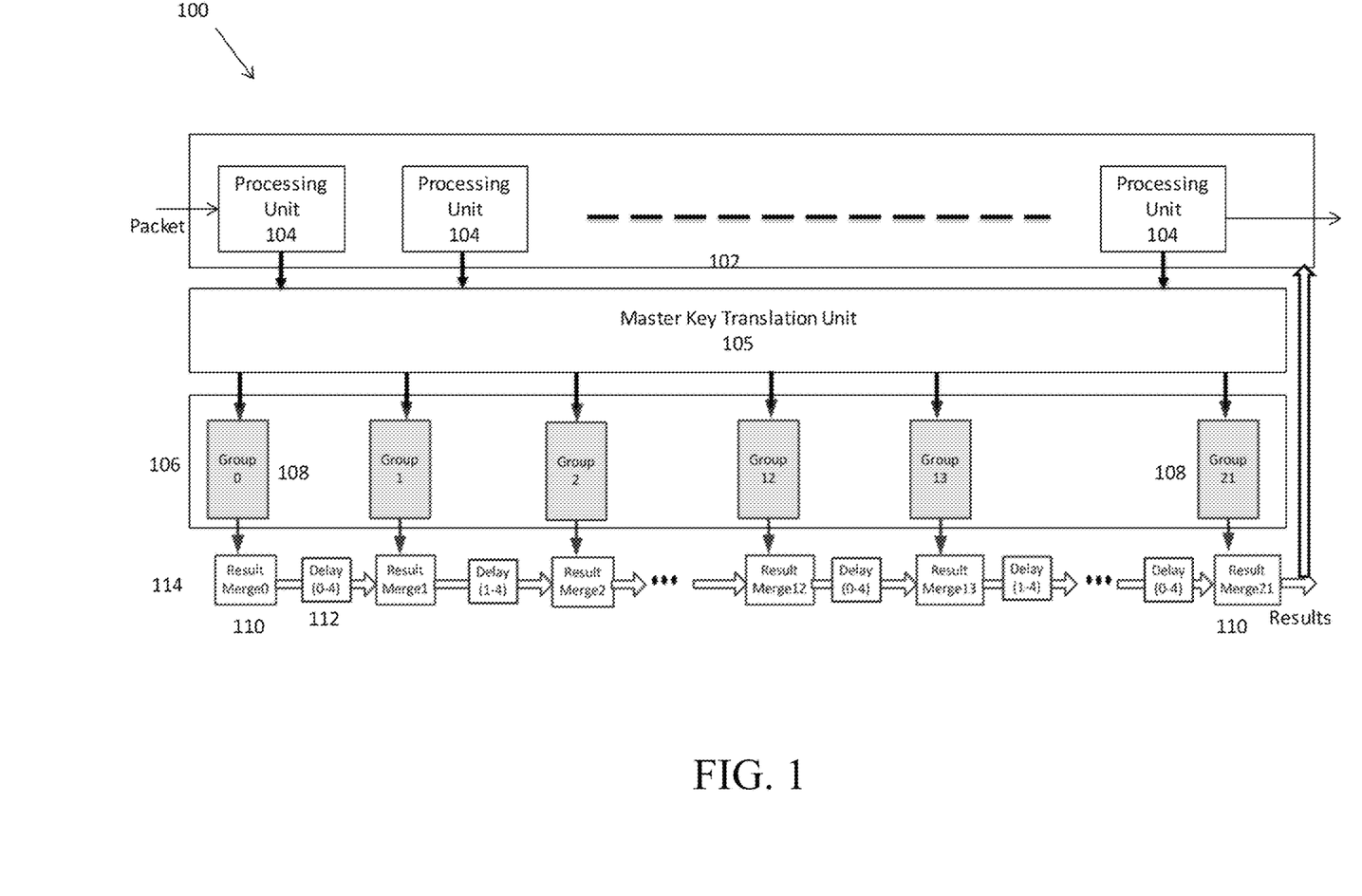
FIG. 1 illustrates an example of a diagram of a hardware network switch 100 configured to support scalable and flexible ACL table and WCM table lookup in accordance with some embodiments.

FIG. 1 illustrates an example of a diagram of a hardware network switch 100 configured to support scalable and flexible ACL and WCM table lookup. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 1, the network switch 100 includes a plurality of packet processing units 104s in a flexible packet processing pipeline 102 configured to process a received data/communication packet through multiple stages based on ACL or WCM table lookup/search results. Each packet processing unit 104s in the packet processing pipeline 102 interacts with one or more of a plurality of memory groups 108s in a memory pool 106 configured to maintain the ACL and/or WCM contents in tables to be searched by the packet processing pipeline 102.

As one of the processing stages in the packet processing pipeline 102, each packet processing unit 104 is configured to generate a master table lookup key (or simply a master key) for an ACL or WCM table lookup request and to process/modify a network packet received based on search results of ACL or WCM table content in the memory groups 108s looked up via the master key. Here, for non-limiting examples, the master key can be either 384 or 192 bits in size based on hardware limitations. Specifically, the packet processing unit 104 examines one or more specific fields and/or bits in the packet received to determine conditions and/or rules of configured protocols and generates the master key accordingly based on the examination outcomes. The packet processing unit 104 also checks the search results of the ACL and/or WCM content via the master key to determine processing conditions and/or rules and to process the packet based on the conditions and/or rules determined. Here, the conditions and/or rules for key generation and packet processing are fully programmable by software and are based on network features and protocols configured for the processing stage of the packet processing unit 104. Once the packet has been processed by all relevant packet processing units 104s in the current packet processing pipeline 102, the packet is transmitted out of the network switch 100 for delivery over the network.

In some embodiments, each packet processing unit 104 has its own corresponding local memory group 108, which the packet processing unit 104 interacts with for search of ACL and WCM contents in the tables stored there. In some embodiments, the network switch 100 adopts flexible packet processing, where a logical (ACL or WCM) table can be stored across multiple memory groups 108s and be accessed by one or more of the packet processing units 104s in the packet processing pipeline 102. In some embodiments, the network switch 100 with flexible packet processing capabilities further groups a plurality of memory pools 106s together via interconnects on the network switch 100 to accommodate and store different table types as well as entry widths, wherein multiple memory pools 106s can also be accessed by any of the packet processing units 104s in parallel for best memory efficiency.

In some embodiments, each packet processing unit 104 is configured to identify one or more memory groups 108s that maintain tables of the ACL and/or WCM content to be searched (in some embodiments, the ACL and WCM masks are stored in tables across multiple memory groups 108s). The packet processing unit 104 is then configured to send the master key to the memory groups 108s in the form of a search/lookup request and receive as search results the ACL and/or WCM rules from the memory groups 108s in return.

In some embodiments, the network switch 100 further includes a master key translation unit 105 configured to perform one or more transformations to the master key to facilitate or simplify downstream ACL or WCM table lookup operations before the master key is sent to the memory pool 106. Specifically, the master key translation unit 105 is configured to extract a plurality of fields of the master key for lookup and replace values of certain fields in the master key that fall within certain ranges with some predetermined code/values. The resulting master key may not necessarily have the same width (number of bits) as the original master key before the translation and have larger or smaller width than the width of original master key. In some embodiments, the master key translation unit 105 is configured to convert certain field values of the master key to other values that are better understood by the memory groups 108s for ACL or WCM table lookup operations by, for a non-limiting example, grouping the fields of the master key into one or more bins. In some embodiments, the master key translation unit 105 is configured to lookup information of the next state based on the current state of the network switch 100 and to compress long IP addresses (e.g., IPv6 addresses) in the master key into shorter sized values (e.g., 32 bits).

Figure 2:
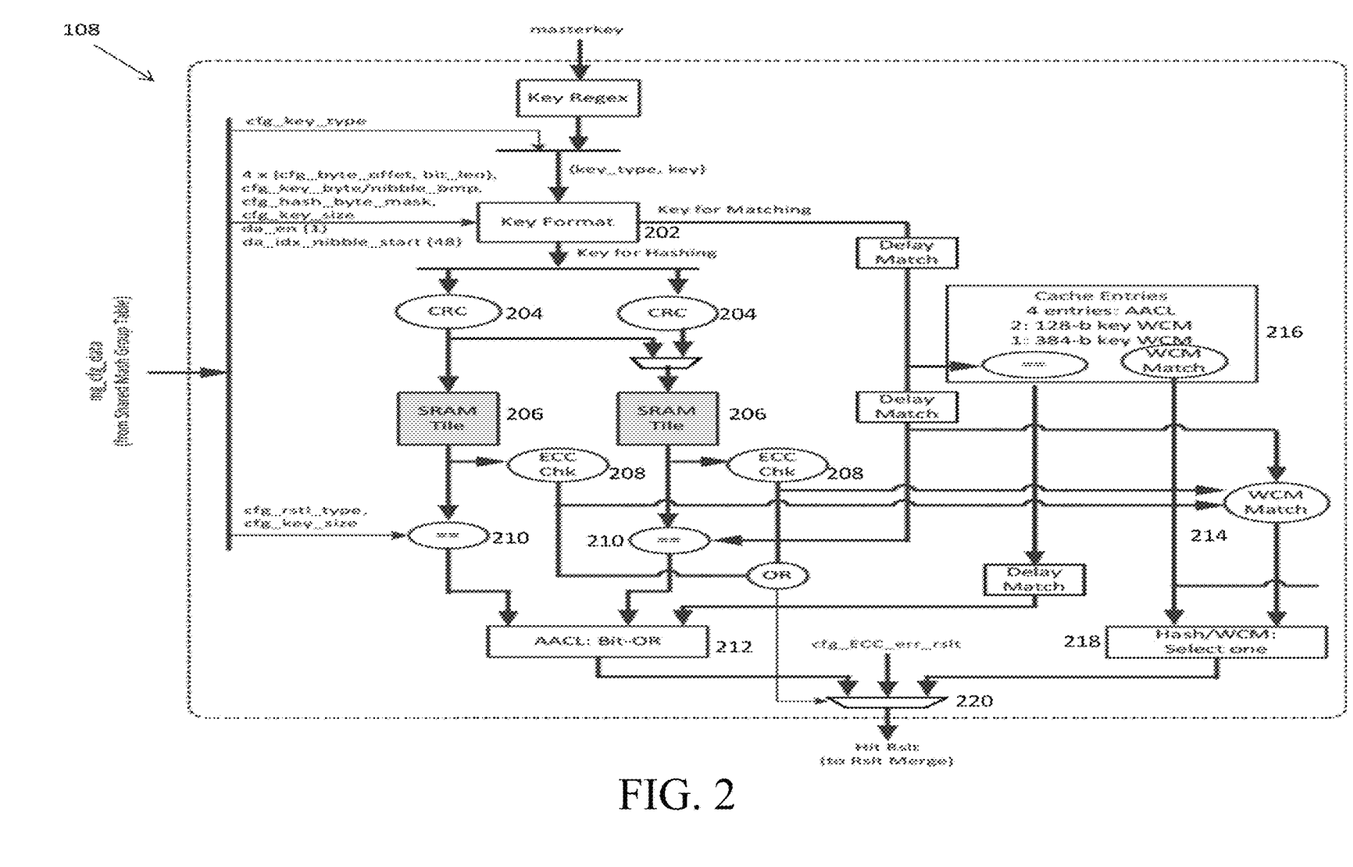
FIG. 2 depicts an example of a diagram of a memory group of FIG. 1 configured to support scalable and flexible ACL table and WCM table lookup in accordance with some embodiments.

FIG. 2 depicts an example of a diagram of a memory group 108 of FIG. 1 configured to support scalable and flexible ACL and WCM lookup via two main stages/steps—key formatting and result (ACL and WCM) lookup. In the example of FIG. 2, a memory group 108 is configured to accept as its input a master key from a packet processing unit 104, format the master key into one or more search keys specific to the memory group 108 via a key format module 202, and search one or more SRAM memory tiles 206s in the memory group 108 via hashing and matching of the search keys via one or more table search requests/commands. Here, each SRAM memory tile 206 includes a hash function circuitry (not shown) and can be a plurality of rows (e.g., 1024) in depth and a certain number of bits (e.g., 128) in width. It maintains one or more (ACL or WCM) lookup tables that can be accessed and searched by the packet processing units 104s. In some embodiments, the search commands can be sent to the SRAM memory tiles 206s in parallel and each of the search commands includes identification/type of the tables to be searched and the search key specific to the SRAM memory tiles 206s. In some embodiments, the search results to be returned to the packet processing unit 104 may include, for non-limiting examples, search hit/miss indication, a hit address in the SRAM memory tiles 206s where a hit data is found, and the hit data (e.g., ACL or WCM result), wherein the hit data would contain the ACL rules that the packet processing unit needs to process the packet.

Figure 3A:
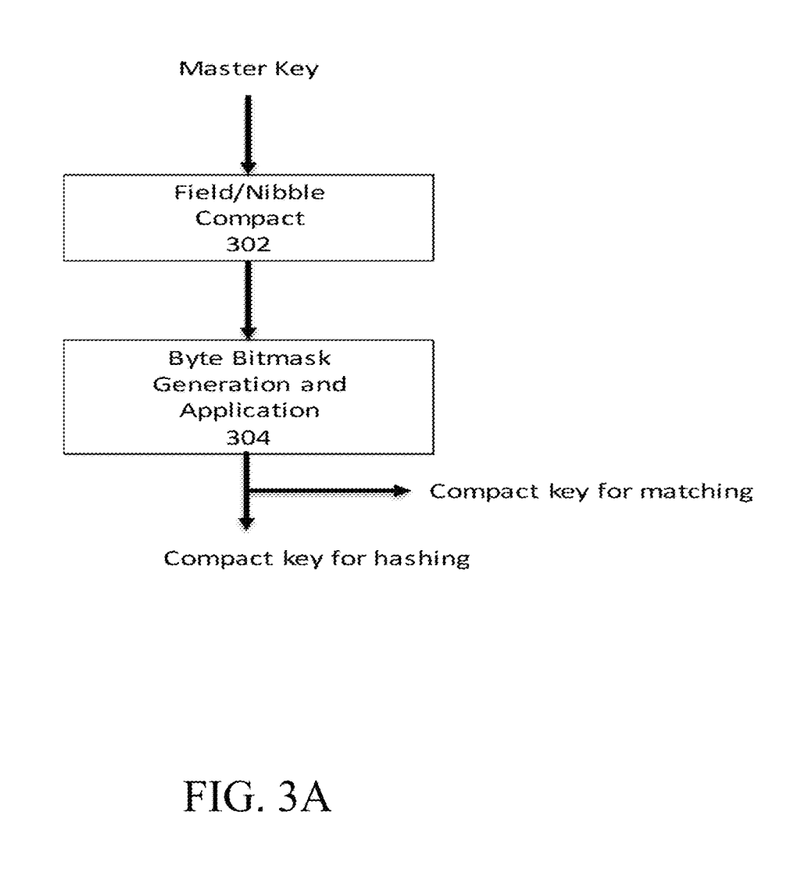
FIG. 3A depicts an example of flow of main steps of operations by the key format module 202 of FIG. 2 to format the master key for ACL table lookup in accordance with some embodiments.

Note that the master key is formatted differently for ACL and WCM lookup by the same memory group 108 as discussed in details below. FIG. 3A depicts an example of flow of main steps of operations by the key format module 202 of FIG. 2 to format the master key for ACL lookup. Here, the master key can be of n bits in length in the form of key[N:0]. In some embodiment, the key format module 202 is configured to accept the n-bit master key as its input and segment it into a plurality (m) of fields/segments ($n_0$, $n_1$, . . . , $n_m$) at k bits granularity, which for a non-limiting example, into m nibbles that are each 4 bits in size. Note that a user may not care about certain (source or destination) IP addresses and/or ports in the master key for the purpose of routing the network packet. The key format module 202 is then configured to create a bitmap for the segmented master key per user configuration as shown by the example below, where each bit in the bitmap indicates if a corresponding field is a care or don't-care field for the purpose of ACL lookup or not (e.g., 1 means the corresponding field is a care field, while 0 means it is a don't-care field):

| Master key: | $n_0, n_1, n_2, n_3, n_4, n_5, n_6, n_7, n_8, n_9$ |
|---|---|
| Key bitmap: | 1, 0, 1, 1, 0, 1, 1, 1, 0, 0 |

The key format module 202 is then configured to compact the master key into a compact key, which includes only the care fields of the master key and is thus shorter in size than the master key as shown by the example below:

Compact key: $n_7\ n_5\ n_3\ n_2\ n_0$

The compact key can be organized by the key format module 202 into a plurality of bytes, each including one or more fields of the compact key. For a non-limiting example, one byte 8 bits in length may include two 4-bit nibbles in the compact key. By making the compact key potentially much shorter than the master key, the key format module 202 aims at IPv6 address compression, pre-filtering the master key and reducing the size of the tables to be searched. Note that both the granularity or size of the fields and/or the bytes for the compact key are software configurable to make flexible and scalable ACL and WCM (discussed below) lookup possible. At Step 304, the key format module 202 is further configured to create a plurality of byte-wise bitmasks for the plurality of bytes in the compact key, wherein each bitmask has the same number of bits as a byte and each bit in the bitmask indicates whether the corresponding bit in the byte of the compact key is a don't care bit or not for the ACL lookup.

Figure 3B:
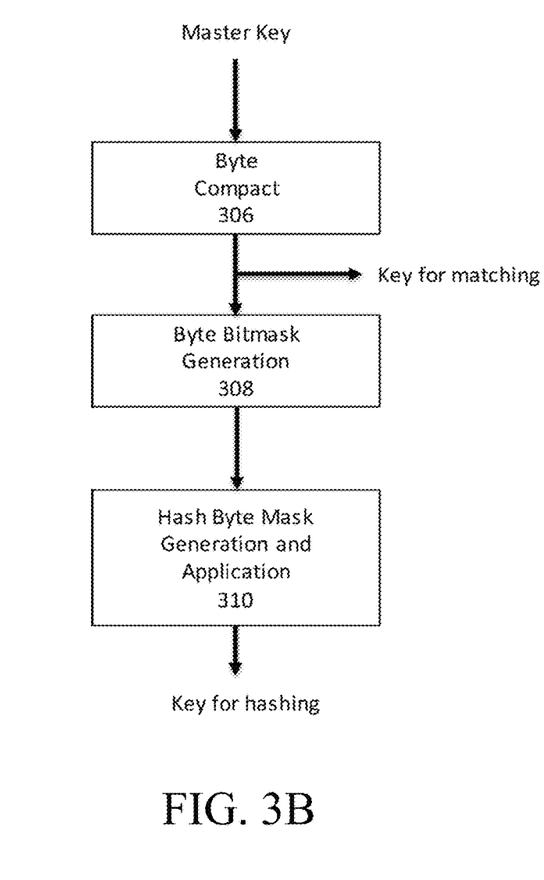
FIG. 3B depicts an example of flow of main steps of operations by the key format module of FIG. 2 to format the master key for WCM table lookup in accordance with some embodiments.

FIG. 3B depicts an example of flow of main steps of operations by the key format module 202 of FIG. 2 to format the master key for WCM. Similar to formatting the master key for ACL lookup, the key format module 202 is first configured to accept the n-bit master key as its input and segment it into a plurality (m) of bytes/byte-fields ($n_0$, $n_1, \ldots, n_m$) at byte-size granularity. The key format module 202 is then configured to create a bitmap for the master key, where each bit in the bitmap indicates if a corresponding byte is a care or don't-care byte for the purpose of WCM. The key format module 202 is then configured to compact the master key into a compact key at Step 306, wherein the compact key includes only the care bytes of the master key as indicated by the bitmap. Step 306 is followed by two-step masking process where at Step 308, the key format module 202 is configured to create a plurality of byte-wise bitmasks for the plurality of bytes in the compact key, wherein each byte-wise bitmask has the same number of bits as a byte and each bit in the byte-wise bitmask indicates whether the corresponding bit to a byte of the compact key is be ignored during hashing later in CRC module 204 as discussed below. Here, the particular byte that the bitmask applies to is configurable. In some embodiments, the key format module 202 is further configured to create a configurable byte-mask vector to further reduce the size of the compact key for WCM at Step 310, wherein each bit in the byte-mask vector indicates a corresponding byte of the compact key is to be ignored during hashing.

Once the compact key have been created by the key format module 202, they are provided for hashing, looking up, and matching with key values retrieved from the SRAM tiles 206s. In some embodiments, one or more cyclic redundancy check (CRC) module 204 of the memory group 108 is each configured to calculate a CRC code (a.k.a. hash value) from the compact key, wherein the CRC code is then used to index and read/look up content (ACL or WCM rules) from the SRAM tiles 206s. It should be noted that the CRC encoding is just one way to hash and there are other well-known ways to generate hash index that also be applied here. Since the CRC code has a fixed length, it can be used as a hash index of the compact key for looking up the SRAM tiles 206s. In some embodiments, multiple CRC modules 204s can be utilized to calculate multiple CRC codes to multiple SRAM tiles 206s in parallel as shown by the example of FIG. 2.

In the example of FIG. 2, each SRAM tile 206 in the memory group 108 is configured to look up and retrieve corresponding data (ACL or WCM) from the lookup tables stored in the SRAM tile 206 based on the hashed index/CRC code of the compact key. For ACL lookup, each ACL table in the SRAM tile 206 is a scalable and flexible hash table that is advanced (i.e., including more than just ACL rules) and algorithmic in nature where each row of data may include, in addition to the ACL rules, at least the following sections: priority ACL rules and keys used to lookup the ACL rules. In case of WCM, the key may actually contain multiple fields: match value and match instructions as described in the "Hybrid wildcard match table" patent application. Given that the priority and the WCM key may take up the entire entry of the SRAM tile 206, in some embodiments, the result data portion may be actually located in another SRAM tile 206, which means that there is a second SRAM read to retrieve this result data from the second SRAM tile 206.

In some embodiments, SRAM tile 206 is configured to support range matching on the lookup tables using the compact key, wherein one or more fields in the compact key are matched with a range value pairs contained in the key section of the SRAM tile data. For a non-limiting example, the range for a field value can be specified within a range of {5-8}, which marches with a corresponding field value of 6, but not 9, during the lookup operation. Such range matching provides additional flexibility and may result in a more concise set of data (rules). For a non-limiting example, a range rule may eliminate/replace multiple wildcard rules.

Since the SRAM tile 206 may have wrong/damaged bit(s) in its storage, in some embodiments, an error checking and correcting (ECC) module 208 of the memory group 108 is configured to check the retrieved row of data from the SRAM tiles 206 for single or double bit error(s) and, when necessary, correct any detected bit error(s) in the retrieved row of data on the fly. In some embodiments, an ECC error is checked by the ECC module 208 on the side, but the data is not corrected when a single event upset occurs and single-bit error is detected. This allows for reduction in read latency in case that the memory read latency is critical.

In some embodiments, the ECC module 208 allows for graceful resolution, i.e., the downstream processing to act appropriately, rather than returning non-sense data in case that a single-bit or double-bit error is detected. Specifically, the ECC module 208 is configured to provide an ECC-error bit/signal to hit result module 220, which returns a pre-defined hit data to the corresponding packet processing unit 104 that initiates the search/lookup to indicate that the hit data may include wrong bits. In some embodiments, if there is an error detected (e.g., single or double bits error), the hit result module 220 is configured to utilize the ECC-error status to modify the search result in one of the following ways:

The hit result module 220 returns a set of same configurable default result for either the single or double bits error including hit status, hit address, priority, and data;

Alternatively, the hit result module 220 returns one of two default results based on whether the error is single or double bits error. The hit result module 220 may also optionally return the ECC error bit position in the data and/or the address of the error.

In some embodiments, when the memory group 108 operates in ACL mode, the key section in the retrieved row of data is matched with the compact key at ACL comparing module 210 to determine if there is a match or hit after error checking and correction by the ECC module 208. If a hit is found for the compact key, the priority of the hit data (ACL), its address in the SRAM tile 206, and the hit data is returned as an output from the memory group 108 to the corresponding packet processing unit 104 that initiates the search/lookup via the hit result module 220. In some embodiments, there may be multiple hits of the hashed index, from either one SRAM tile 206 or multiple resulting in multiple row of hit data being retrieved from the SRAM tile 206. Under such scenario, the ACL bit-OR module 212 is configured to perform a bit-OR operation of the hit data (ACL values) from the multiple hits and return the bit OR'ed hit data together with a pre-defined priority number indicating that multiple hits have been found for the lookup. Here, the pre-defined priority number is software configurable by the user.

In some embodiments, when the memory group 108 operates in WCM mode, wildcard matching between the compact key and the key section in the retrieved row of data by WCM match module 214 after error checking and correction by the ECC module 208. If a hit is found for the compact key, the priority of the hit data (WCM), its address in the SRAM tile 206, and the hit data is returned as an output from the memory group 108 to the corresponding packet processing unit 104 that initiates the search/lookup via the hit result module 220. In some embodiments, if there are multiple hits of the hashed index from different SRAM tiles 206s, the multiple match results are prioritized based on the priority, and the match result with the highest priority is selected and returned.

In some embodiments, the incoming master key undergoes a regular expression operation to increase flexibility of WCM by modifying certain bytes/fields of the master key if they match certain criteria of the regular expression before key formatting by the key format module 202. For a non-limiting example, WCM may want to apply rules for source subnet 192.168.*.* to subnet 10.1.*.*. In this case, source IP address prefix 192.168 can be replaced with 10.1 via the regular expression operation. Here, the regular expression operation can be, for a non-limiting example, as follows:

if ((master key & match_mask) ==match_pattern):
    modified master key =(master key & ~match_mask) |subst_pattern wherein the match_mask indicates relevant bits for matching and substitution. According to the regular expression operation, if there is a match between the master key and the match_mask, then the matching fields of the compact key are replaced with the subst_pattern. Here, match_mask, match_pattern, and subst_pattern are all configurable patterns stored in configuration registers of the memory group 108. Preferably, these configurable patterns are as wide as the master key. In some embodiments, however, the configurable patterns are in reduced forms due to area limitations, wherein a key field selection signal key_field_sel selects one or more specific fields of the master key (e.g., 32 or 16 bits in size) to compare to the match_pattern as illustrated by the example of the following table:

| Field name | Width | Type | Description |
|---|---|---|---|
| Compact key | 67 | config | Key Regular Expression before Key formatting |
| key_field_sel | 2 | | Select which field in the masterkey for matching:<br>0x0: 32b SIP subnet field (masterkey[31:0])<br>0x1: 32b DIP subnet field (masterkey[63:32])<br>0x2: 16b Src range field (masterkey[79:64])<br>0x3: 16b Dst range field (masterkey[95:80]) |
| match_pattern | 32 | | Value to match |
| subst_pattern | 32 | | If matched, replace this pattern to the selected field |

In some embodiments, for both the ACL and the WCM mode, the ACL and/or the WCM content can be looked up directly from cache 216 via the compact key. Here, cache 216 is used to store extra table entries of the SRAM tiles 206s. When a new SRAM table entry needs to be added to a SRAM tile 206 but the SRAM tile 206 has no free entry space available (because that entry is occupied), the current occupant entry may be evicted by the SRAM tile 206 and placed in the cache 216. The new entry to the SRAM table is then inserted into the newly freed entry space. The cache entry format can be the same as or be different from the SRAM format. During operations, the cache 216 operates in parallel with the lookup operations of the SRAM tiles 206 and the matching operations of the ACL comparing module 210 and the WCM match module 214. For ACL mode, the cache results from the cache 216 and the SRAM matching results from the ACL comparing module 210 are then combined in the ACL bit-OR module 212 before being provided to the hit result module 220. For WCM mode, the cache results from the cache 216 and the WCM matching results from the WCM match module 214 are provided to the hash/WCM select module 218, which selects and provides one of the results to the hit result module 220. In some embodiments, the cache and SRAM match results each has a priority (e.g., 16 bits in length) and the hash/WCM select module 218 picks the one with higher priority.

In some embodiments, the hit result module 220 is configured to perform post search filtering on the hit results by comparing portion of the result data against a list of result types. Only those hit results that match one of the result types are returned as hits. In some embodiments, the list of result types is passed from the packet processing unit 104 to the memory groups 108. In some alternative embodiments, the list of result types is passed via the master key.

In the example of FIG. 1, multiple memory groups 108s, Group 0, . . . , Group N, in the memory pool 106 can be utilized to format the master key and look up ACL and WCM results in parallel. Such multi-memory group search is especially needed when a table to be searched resides across multiple memory groups 108s, wherein each memory group 108 maintains a portion (e.g., a plurality of rows and/or columns) of the table. After parallel search is performed by multiple memory groups 108s in the memory pool 106, the result data returned by the memory groups 108s is then collected and merged together via a plurality of result merging units 110s connected/chained sequentially in a pipeline/chain 114, wherein each merging unit 110 accepts search result from one of the memory groups 108s and merge the result with an output from a preceding merging unit 110 in the pipeline. In some embodiments, the output from the preceding merging unit 110 may be delayed by a delaying circuitry 112 in order to compensate for dispatch delays between the different processing units 104 and the memory groups 108 via a dispatch network (not shown) and to sync up with search result received by the current merging unit 110. The output from the last merging unit 110 in the chain 114 is then provided to its corresponding packet processing unit 104 that initiates the search/lookup as the final search results. As discussed above, the final search result may include search hit/miss indication, a hit address in the SRAM memory tiles 206s where a hit data is found, and the hit data (e.g., ACL or WCM result). In some embodiments, the final search result is returned by the chain 114 as a plurality of (e.g., four) result lanes, wherein each result lane represents a portion of the search result.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A network switch to support scalable and flexible access control list (ACL) lookup, comprising:
 a packet processing pipeline including a plurality of packet processing units configured to process a received packet through multiple packet processing stages, wherein each of the packet processing units is configured to
  generate and provide a master key for an ACL lookup request to a memory pool;
  process the received packet based on ACL search results of the ACL lookup request returned from the memory pool;
 said memory pool including a plurality of memory groups to be searched by the packet processing pipeline, wherein each of the memory groups is configured to
  maintain a plurality of ACL tables to be searched in one or more static random-access memory (SRAM) tiles of the memory group;
  accept and format the master key generated by the packet processing unit into a compact key based on a bitmap per user configuration, wherein the compact key is shorted in size than the master key;
  hash the formatted compact key and search the ACL tables stored in the one or more SRAM tiles of the memory group using the formatted compact key;
  retrieve, check, and correct row of data from the SRAM tiles for single or double bit errors in the retrieved row of data;
  process and provide the row of data as the ACL search results to the requesting packet processing unit.

2. The network switch of claim 1 wherein:
 each packet processing unit is configured to examine one or more fields and/or bits in the received packet to determine conditions and/or rules of configured protocols and generate the master key accordingly based on the examination.

3. The network switch of claim 1 wherein:
 each packet processing unit is configured to identify and interact with one or more of the plurality of memory groups in the memory pool for sending the master key and receiving the ACL search results.

4. The network switch of claim 1 further comprising:
 a master key translation unit configured to perform one or more transformations to the master key to simplify downstream ACL lookup operations before the master key is sent to the memory pool.

5. The network switch of claim 1 wherein:
 each memory group is configured to
  segment the master key into a plurality of fields at k bits granularity;
  create the bitmap for the segmented master key per user configuration, where each bit in the bitmap indicates if a corresponding field is a care or don't-care field for the purpose of the ACL lookup;
  compact the master key into the compact key, wherein the compact key includes only the care fields of the master key as indicated by the bitmap.

6. The network switch of claim 5 wherein:
 each memory group is configured to
  organize the compact key into a plurality of bytes, each including one or more fields of the compact key;
  create a plurality of byte-wise bitmasks for the plurality of bytes in the compact key, wherein each bitmask has the same number of bits as a byte and each bit in the bitmask indicates whether the corresponding bit in the byte of the compact key is a don't care bit or not for the ACL lookup.

7. The network switch of claim 6 wherein:
 both the granularity or size of the fields and/or the bytes for the compact key are software configurable.

8. The network switch of claim 1 wherein:
 each memory group is configured to
  calculate a cyclic redundancy check (CRC) code for the compact key;
  use the CRC code as a hash index of the compact key for looking up the SRAM tiles.

9. The network switch of claim 1 wherein:
 each memory group is configured to support range matching on the lookup tables using the compact key, wherein one or more fields in the compact key are matched with a range value pairs.

10. The network switch of claim 1 wherein:
 each memory group is configured to generate an error checking and correction signal and modify the ACL search results according to the error checking and correction signal.

11. The network switch of claim 1 wherein:
 each memory group is configured to
  match key section in row of data retrieved with the compact key after the error checking and correction to determine if there is a match or hit;
  return priority of the hit data, an address of the hit data in the SRAM tile, and the hit data as the search result to the corresponding packet processing unit that requests the lookup.

12. The network switch of claim 1 wherein:
 each memory group is configured to look up the ACL directly from a cache via the compact key in case the ACL has been looked up before, wherein the cache operates in parallel with the lookup and matching operations of the SRAM tiles.

13. The network switch of claim 1 wherein:
 each memory group is configured to perform post search filtering on the ACL search results by comparing portion of the results against a list of result types wherein only portions of the results that match one of the result types are returned as hits.

14. The network switch of claim 1 wherein:
 multiple memory groups in the memory pool are utilized to format the master key and look up the ACL search results in parallel.

15. The network switch of claim 14 further comprising:
 a plurality of result merging units connected sequentially in a pipeline wherein each result merging unit is configured to accept a search result from one of the memory groups and merge the result with output from a preceding merging unit in the pipeline after parallel search is performed by multiple memory groups in the memory pool.

16. The network switch of claim 15 wherein:
 output from the last merging unit in the pipeline is provided to the packet processing unit that requests the lookup as the final ACL search results.

17. A method to support scalable and flexible access control list (ACL) lookup in a network switch, comprising:
 generating and providing a master key for an ACL lookup request to a memory pool via one of a plurality of packet processing units in a packet processing pipeline;
 accepting and formatting the master key into a compact key via each of a plurality of memory groups in a memory pool based on a bitmap per user configuration, wherein the memory group maintains a plurality of ACL tables to be searched in one or more static random-access memory (SRAM) tiles, and wherein the compact key is shorted in size than the master key;

hashing the formatted compact key and searching the ACL tables stored in the one or more SRAM tiles of the memory group using the formatted compact key;

retrieving, checking, and correcting row of data from the SRAM tiles for single or double bit errors in the retrieved row of data;

processing and providing the row of data as ACL search results to the requesting packet processing unit;

processing a received packet at the packet processing unit based on ACL search results of the ACL lookup request returned from the memory pool.

18. The method of claim 17 further comprising:
examining one or more fields and/or bits in the received packet to determine conditions and/or rules of configured protocols and generate the master key accordingly based on the examination.

19. The method of claim 17 further comprising:
identifying and interacting with one or more of the plurality of memory groups in the memory pool for sending the master key and receiving the ACL search results.

20. The method of claim 17 further comprising:
performing one or more transformations to the master key to simplify downstream ACL lookup operations before the master key is sent to the memory pool.

21. The method of claim 17 further comprising:
segmenting the master key into a plurality of fields at k bits granularity;
creating the bitmap for the segmented master key per user configuration, where each bit in the bitmap indicates if a corresponding field is a care or don't-care field for the purpose of the ACL lookup;
compacting the master key into the compact key, wherein the compact key includes only the care fields of the master key as indicated by the bitmap.

22. The method of claim 21 further comprising:
organizing the compact key into a plurality of bytes, each including one or more fields of the compact key;
creating a plurality of byte-wise bitmasks for the plurality of bytes in the compact key, wherein each bitmask has the same number of bits as a byte and each bit in the bitmask indicates whether the corresponding bit in the byte of the compact key is a don't care bit or not for the ACL lookup.

23. The method of claim 17 further comprising:
calculating a cyclic redundancy check (CRC) code for the compact key;
using the CRC code as a hash index of the compact key for looking up the SRAM tiles.

24. The method of claim 17 further comprising:
supporting range matching on the lookup tables using the compact key, wherein one or more fields in the compact key are matched with a range value pairs.

25. The method of claim 17 further comprising:
generating an error checking and correction signal and modify the ACL search results according to the error checking and correction signal.

26. The method of claim 17 further comprising:
matching key section in row of data retrieved with the compact key after the error checking and correction to determine if there is a match or hit;
returning priority of the hit data, an address of the hit data in the SRAM tile, and the hit data as the search result to the corresponding packet processing unit that requests the lookup.

27. The method of claim 17 further comprising:
looking up the ACL directly from a cache via the compact key in case the ACL has been looked up before, wherein the cache operates in parallel with the lookup and matching operations of the SRAM tiles.

28. The method of claim 17 further comprising:
performing post search filtering on the ACL search results by comparing portion of the results against a list of result types wherein only those portions of the results that match one of the result types are returned as hits.

29. The method of claim 17 further comprising:
utilizing multiple memory groups in the memory pool to format the master key and look up the ACL search results in parallel.

30. The method of claim 29 further comprising:
accepting a search result from one of the memory groups via one of a plurality of result merging units connected sequentially in a pipeline;
merging the result with output from a preceding merging unit in the pipeline after parallel search is performed by multiple memory groups in the memory pool.

31. The method of claim 30 further comprising:
providing output from the last merging unit in the pipeline to the packet processing unit that requests the lookup as the final ACL search results.

* * * * *